Oct. 11, 1949.  E. B. FITZGERALD  2,484,213
CONTROL SYSTEM

Filed Aug. 18, 1945  2 Sheets-Sheet 1

WITNESSES:

INVENTOR
Edward B. Fitzgerald.
BY
ATTORNEY

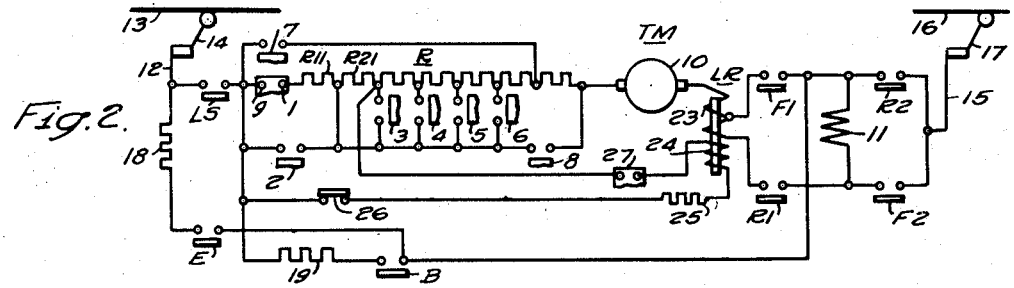

Patented Oct. 11, 1949

2,484,213

UNITED STATES PATENT OFFICE 2,484,213

CONTROL SYSTEM

Edward B. Fitzgerald, Pittsburgh, Pa., assignor to Westinghouse Electric Corporation, East Pittsburgh, Pa., a corporation of Pennsylvania Application August 18, 1945, Serial No. 611,398

5 Claims. (Cl. 318—380)

My invention relates, generally, to control systems and, more particularly, to systems for controlling the operation of electrically propelled vehicles, such as trolley coaches.

On vehicles which are equipped only with straight air brake apparatus, a broken air line, with a corresponding loss of air pressure, leaves the operator dependent on the hand brake for stopping the vehicle. Furthermore, in the case of a trolley coach equipped with pneumatically operated control apparatus loss of air pressure also prevents the operation of the dynamic electric braking equipment.

An object of my invention is to provide for automatically bringing a vehicle under control before complete loss of air pressure from the pneumatically operated control apparatus.

Another object of my invention is to provide for automatically cutting off power from the propelling motor of a vehicle and establishing dynamic braking connections for the motor when the air pressure drops below a predetermined amount.

Other objects of my invention will be explained fully hereinafter or will be apparent to those skilled in the art.

In accordance with one embodiment of my invention, a pneumatically operated pressure relay is utilized to warn the operator of a vehicle, cut off power from the propelling motor and establish dynamic braking connections for the motor independently of the position of the master controller when the pressure in the air supply system drops below a predetermined amount.

For a fuller understanding of the nature and objects of my invention, reference may be had to the following detailed description, taken in conjunction with the accompanying drawing, in which:

Fig. 2 is a schematic diagram of the main circuits shown in Fig. 1; and

Figs. 3, 4 and 5 are charts showing the sequence of operation of the apparatus illustrated in Figs. 1 and 2.

Figure 1:
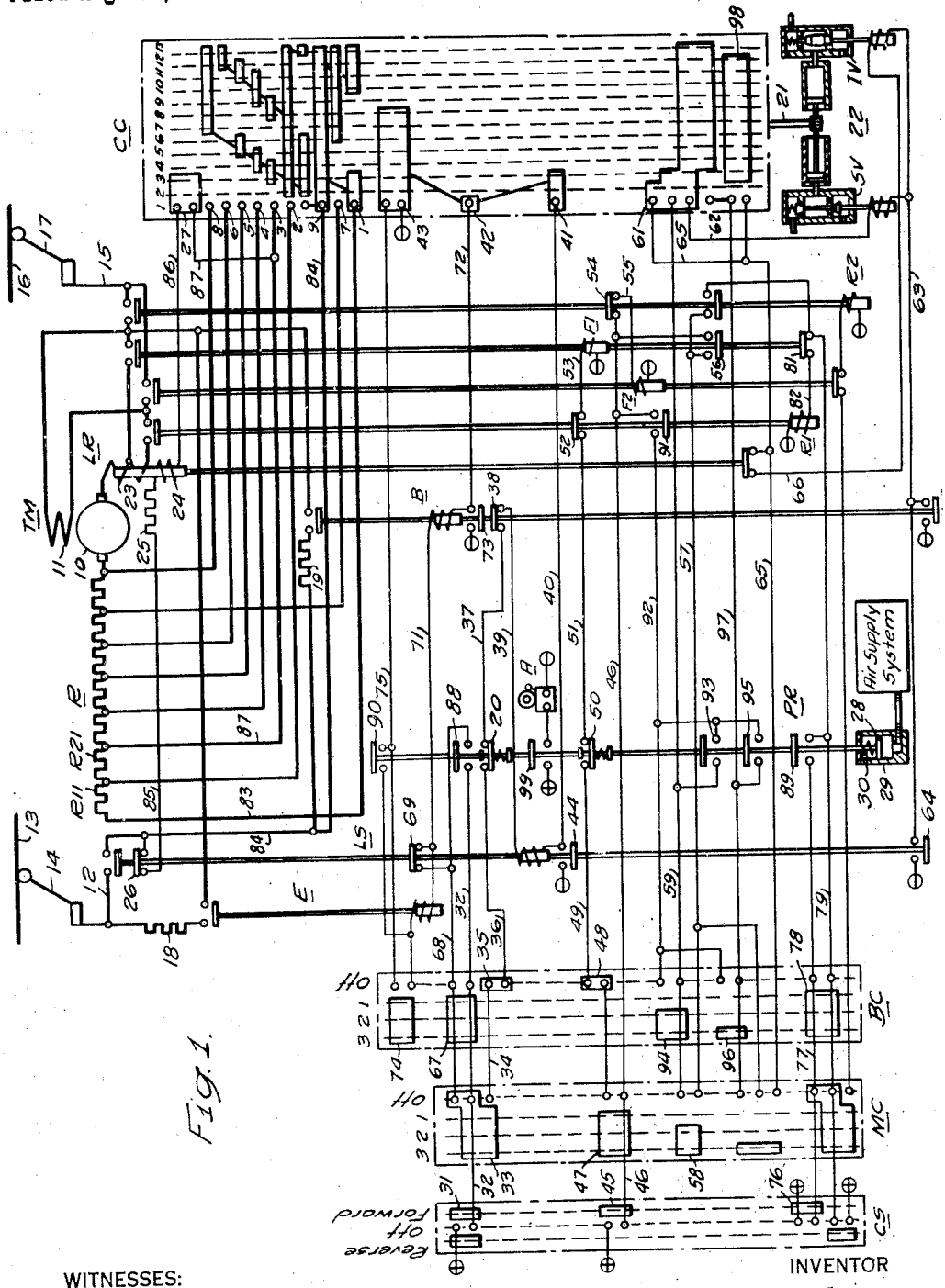
Figure 1 is a diagrammatic view of a control system embodying my invention.

Referring to the drawings, and particularly to Fig. 1, the system shown therein comprises a traction motor TM having an armature winding 10 and a series field winding 11; a line switch LS for connecting the motor TM to a power conductor 12 which may be energized from a trolley conductor 13 through a current collecting device 14; a plurality of reversing switches F1, F2, R1 and R2 for controlling the direction of operation of the motor TM and also connecting the motor to a power conductor 15 which is connected to a trolley conductor 16 through a current collecting device 17; a switch B which cooperates with certain of the reversing switches to establish dynamic braking connections for the motor TM as described in detail in the copending application of L. G. Riley, Serial No. 508,265, filed October 29, 1943, Patent No. 2,456,892, issued December 12, 1948; and a switch E which connects the field winding 11 of the motor TM to the power conductor 12, thereby exciting the motor field during dynamic braking. A resistor 18 is connected in the excitation circuit for the field winding 11 and a resistor 19 is connected in the dynamic braking circuit for the motor TM.

The motor current is controlled both during acceleration and dynamic braking by a resistor R which is shunted from the motor circuit step-by-step by a controlled CC which is provided with a plurality of contact members 1 to 8 inclusive, for shunting the resistor R. The controller CC may be of the cam or the drum type having a shaft 21 which is driven by an air engine 22 of a type well known in the art.

The air engine 22 is provided with a standard magnet valve SV and an inverted magnet valve IV. The operation of the air engine is automatically controlled during both acceleration and dynamic braking by a current limit relay LR having a series coil 23 which is connected in the motor circuit and is, therefore, responsive to the motor current during both acceleration and dynamic braking. The series coil 23 is divided into two sections, only one of which is utilized during acceleration and both of which are utilized during dynamic braking, thereby changing the calibration of the relay LR during braking.

In order to provide for changing the calibration of the limit relay LR still further during dynamic braking to prevent the maximum permissible voltage for the motor from being exceeded when the vehicle is operating at high speeds, the relay LR is also provided with a shunt coil 24. As shown and claimed in the copending application of S. E. Newhouse, Serial No. 589,474, filed April 21, 1945, Patent 2,479,397, issued August 16, 1949, the shunt coil 24 is connected across two steps of the resistor R through a resistor 25 and contact members 26 on the line switch LS and 27 on the controller CC. These are the first two steps which are shunted from the motor circuit during dynamic braking. It will be understood that the coil 24 may be connected across one or more additional steps of the resistor R if desired.

Manually operable controllers CS and MC are provided for controlling the operation of the reversing switches and the line switch LS, and for controlling the supply of control current to the air engine 22. The controller MC controls the operation of the control apparatus during acceleration, and a controller BC controls the operation of the apparatus during dynamic braking. The controllers MC and BC are interlocked in the usual manner to prevent improper operation of the equipment in the event that both of the controllers are operated simultaneously.

With a view to disconnecting the motor TM from the power source and automatically establishing the dynamic braking circuit for the motor in the event that the pressure in the air supply system decreases below a certain amount, an air pressure relay PR is provided. As shown, the relay PR comprises a piston 28 disposed in a cylinder 29. The cylinder 29 is so connected to the air supply system that the piston 28 is forced upwardly against a spring 30, thereby closing certain contact members of the relay and opening other contact members so long as the pressure in the air supply system is maintained above a certain amount.

When the pressure in the system is lowered, the piston 28 is actuated downwardly to open certain of the contact members and close the other contact members. As shown, the contact members which are closed when the piston is actuated upwardly by the air pressure may be slidably mounted on the stem of the relay and biased upwardly by springs disposed on the relay stem. These contact members may be so mounted on the relay stem that they open a short time prior to the closing of the other contact members, as the piston 28 moves downwardly.

The contact members of the relay PR are so connected in the control system that the motor TM is first disconnected from the power source and the dynamic braking circuits then established when the air pressure falls below a predetermined amount. An alarm A, which is energized through a circuit established by one of the contact members of the relay PR, is provided to warn the operator of the decrease in the pressure in the air supply system.

In order that the functioning of the foregoing apparatus may be more clearly understood, the operation of the system will now be described in more detail. Assuming that it is desired to accelerate the vehicle in a forward direction, the control switch CS is actuated to the forward position and the controller MC is actuated to position 1. At this time, an energizing circuit is established for the actuating coil of the line switch LS, which may be traced from positive through a contact segment 31 on the control switch CS, conductor 32, a segment 33 on the controller MC, conductor 34, a segment 35 on the controller BC, conductor 36, contact members 20 on the relay PR, conductor 37, an interlock 38 on the switch B, conductor 39, the actuating coil of the switch LS, conductor 40, and contact members 41, 42 and 43 on the controller CC to negative. A holding circuit is established for the line switch LS through an interlock 44 on the switch LS.

At this time, the reversing switches F1 and F2 are also closed. The energizing circuit for the switch F1 extends from positive through a contact segment 45 on the switch CS, conductor 46, a segment 47 on the switch MC, a segment 48 on the controller BC, conductor 49, contact members 50 on the relay PR, conductor 51, an interlock 52 on the switch R1, conductor 53 and the actuating coil of the switch F1 to negative. The energizing circuit for the switch F2 extends from the conductor 46 through an interlock 54 on the switch R2, conductor 55 and the actuating coil of the switch F2 to negative.

The closing of the switches LS, F1 and F2 connects the traction motor TM across the power conductors 12 and 15 in series-circuit relation with the resistor R. The air engine 22 may be operated to shunt the resistor R from the motor circuit step-by-step by actuating the controller MC to positions 2 and 3.

When the controller MC is in position 2, the magnet valve SV is energized through a circuit which extends from the conductor 46 through an interlock 56 on the switch F1, conductor 57, a segment 58 on the controller MC, conductor 59, a segment 61 on the controller CC, conductor 62, the coil of the magnet valve SV, conductor 63 and an interlock 64 on the line switch LS to negative. The magnet valve IV is also energized at this time through a circuit which extends from the conductor 59 through the segment 61 on the controller CC, conductor 65, the contact members of the relay LR, conductor 66, the actuating coil of the magnet valve IV, conductor 63 and the interlock 64 to negative.

As explained hereinbefore, the operation of the air engine 22 is under the control of the limit relay LR. Thus, when the motor current exceeds a predetermined amount, the contact members of the relay LR are opened to deenergize the magnet valve IV, thereby stopping the progression of the controller CC. The operator of the vehicle may also stop the progression of the controller CC by holding the controller MC in position 2, thereby stopping the controller CC at a certain point in its travel. The operation of the controller CC may be resumed by actuating the controller MC to position 3.

If it is desired to decelerate the vehicle, the controller MC is actuated to the "off" position, and the controller BC is actuated to one of the braking positions. When the controller MC is returned to the "off" position, the switches LS and F1 are opened to disconnect the motor from the power circuit. Also the magnet valves of the air engine 22 are deenergized, thereby causing the controller CC to be returned to position 1.

When the controller BC is actuated to position 1, the switches B, E and R1 are closed to establish a dynamic braking circuit for the motor TM. The energizing circuit for the switch B may be traced from positive through the segment 31 on the switch CS, conductor 32, a segment 67 on the controller BC, conductor 68, an interlock 69 on the switch LS, conductor 71, the actuating coil of the switch B, conductor 72 and contact members 42 and 43 on the controller CC to negative. A holding circuit for the switch B is established through an interlock 73 on the switch B.

The energizing circuit for the switch E extends from the conductor 71 through the coil of the switch E, a contact segment 74 on the controller BC, conductor 75 and the segment 43 on the controller CC to negative. The energizing circuit for the switch R1 extends from positive through a segment 76 on the switch CS, conductor 77, a segment 78 on the controller BC, conductor 79, an interlock 81 on the switch F1, conductor 82 and the actuating coil of the switch R1 to negative.

As shown in Figs. 1 and 2, the closing of the switches B and R1 establishes a dynamic braking circuit for the motor TM through the resistors R and 19. This dynamic braking circuit includes the series field winding 11 and both sections of the series coil 23 of the relay LR. The field winding 11 is also connected across the power conductors 12 and 15 through the switches E and F2, thereby separately exciting the field winding 11 and ensuring a prompt building up of the dynamic braking effect.

At this time, the shunt coil 24 of the limit relay LR is connected across the first two steps of the resistor R through a circuit which extends from one terminal of the resistor section R11 through conductor 83, contact members 1 and 9 of the controller CC, conductor 84, the interlock 26 on the switch LS, conductor 85, the resistor 25, the shunt coil 24, conductor 86, the contact members 27 on the controller CC and conductor 87 to the one terminal of the resistor section R21.

Thus, the shunt coil 24 is responsive to the voltage-drop across the resistors R11 and R21. The coil 24 is so disposed on the relay LR that it aids the series coil 23, thereby lowering the current setting of the relay which causes the relay to operate at a lower current value. In this manner, the braking current is kept at a low value during the first few steps of braking while the vehicle is operating at a high speed. The reduced armature current reduces the excitation of the motor, which is functioning as a generator, thereby keeping its voltage below the maximum permissible voltage.

The controller CC is operated in a manner similar to that during acceleration to shunt the resistor R from the motor circuit step-by-step during dynamic braking. The operation of the controller CC is under the control of the limit relay LR which functions to prevent the motor current from increasing beyond the setting of the relay. Thus, while the vehicle is operating at a high speed, the resistor sections R11 and R21 are kept in the motor circuit to prevent an excessive amount of current from flowing.

After the resistor sections R11 and R21 are shunted from the circuit, the shunt coil 24 is no longer effective and the setting of the relay LR is increased to the normal setting suitable for operation at moderate speeds of the vehicle. The controller CC is advanced in the usual manner to continue the shunting of the resistor R from the motor circuit.

As explained hereinbefore, the relay PR functions to cut off power from the motor TM and automatically establishes the dynamic braking circuits for the motor in the event that the pressure in the air supply system falls below a predetermined amount. The power is cut off and dynamic braking is established even though the operator retains the controller MC in a power position and does not operate the braking controller BC. In this manner, the vehicle is kept under control and the operator enabled to stop the vehicle prior to the complete loss of air from the air supply system.

As indicated by the sequence chart in Fig. 5, when the air pressure drops, the contact members 20 and 50 of the relay PR are opened, thereby deenergizing the line switch LS and the reversing switch F1. The opening of the switch F1 opens the interlock 56 to deenergize both magnet valves SV and IV, thereby causing the controller CC to be returned to position 1.

The piston 28 of the relay PR continues to travel downwardly, thereby closing contact members of the relay PR, which cause the switches B and R1 to be closed to establish the dynamic braking circuits and the switch E to be closed to energize the field winding of the motor, as hereinbefore described. The switch F2 remains closed since it is assumed that the vehicle is operating in a forward direction. The switch B is closed by the closing of contact members 88 of the relay PR which are connected in parallel-circuit relation to the contact members bridged by the segments 67 of the controller BC. The switch R1 is closed by contact members 89 of the relay PR, which are connected in parallel-circuit relation to the contact members bridged by the segment 78 of the controller BC. The switch E is closed by contact members 90 of the relay PR which are connected in parallel-circuit relation to the contact members bridged by the segment 74 of the controller BC.

Following the closing of the switch R1, the magnet valves SV and IV are energized to advance the controller CC, thereby shunting the resistor R from the motor circuit in the manner hereinbefore described. The controller CC is advanced regardless of the positions of controllers MC and BC. The energizing circuits for the magnet valves SV and IV extend from the conductor 46 through an interlock 91 on the switch R1, conductor 92, contact members 93 on the relay PR, which parallel the contact members bridged by a segment 94 of the controller BC, conductor 59, and thence through the actuating coils of the magnet valves SV and IV through circuits previously traced. Contact members 95 of the relay PR parallel contact members bridged by a segment 96 on the controller BC, thereby energizing a conductor 97 to keep the magnet valves energized through a segment 98 on the controller CC after the controller has moved past the first few positions.

As explained hereinbefore, a signalling device A is energized through contact members 99 of the relay PR when the pressure in the air supply system drops. In this manner, the operator of the vehicle is notified of the trouble in the air supply system.

From the foregoing description, it is apparent that I have provided a control system which will automatically cut off power from the propelling motor of a vehicle and establish dynamic braking circuits for the motor when the pressure in the air supply system for the vehicle drops below a predetermined amount. In this manner, the vehicle is kept under control at all times, and the operator is enabled to stop the vehicle before the complete loss of the air pressure. The present system greatly increases the safety of vehicles, such as trolley coaches, since loss of control of the vehicle by failure of the air supply system is prevented.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system for a motor having an armature winding and a series field winding, in combination, switching means for establishing dynamic braking connections for the motor, said connections including a circuit for separately exciting the motor field winding, fluid-pressure actuated means for causing the operation of said switching means to establish said dynamic braking connections when the fluid pressure drops below a predetermined amount, signalling means controlled by said fluid-pressure actuated means, control means controlled by said fluid-pressure actuated means for disconnecting the separate excitation circuit after the dynamic braking connections have been established, and relay means responsive to the dynamic braking current for also controlling the operation of said control means.

2. In a control system for a motor having an armature winding and a series field winding, in combination, switching means for establishing dynamic braking connections for the motor, said connections including a circuit for separately exciting the motor field winding, a controller for normally controlling the operation of said switching means, fluid-pressure actuated means for causing the operation of said switching means independently of said controller to establish said dynamic braking connections when the fluid pressure drops below a predetermined amount, control means controlled by said fluid-pressure actuated means for controlling the dynamic braking current, and relay means responsive to the dynamic braking current for also controlling the operation of said control means.

3. In a control system for a motor having an armature winding and a series field winding, in combination, switching means for establishing dynamic braking connections for the motor, said connections including a circuit for separately exciting the motor field winding, a controller for normally controlling the operation of said switching means, fluid-pressure actuated means for causing the operation of said switching means independently of said controller to establish said dynamic braking connections when the fluid pressure drops below a predetermined amount, signalling means controlled by said fluid-pressure actuated means, control means controlled by said fluid-pressure actuated means for controlling the dynamic braking current, and relay means responsive to the dynamic braking current for also controlling the operation of said control means.

4. In a control system for a motor having an armature winding and a series field winding, in combination, a power conductor, switching means for connecting the motor to the power conductor, additional switching means for establishing dynamic braking connections for the motor, said connections including a circuit for energizing the motor field winding from the power conductor, a fluid-pressure relay responsive to a predetermined drop in fluid pressure for controlling the operation of said switching means to disconnect the motor armature winding from the power conductor and establish said dynamic braking connections, control means controlled by said relay for opening the circuit for energizing the motor field winding from the power conductor after the dynamic braking connections have been established, and relay means responsive to the dynamic braking current for also controlling the operation of said control means.

5. In a control system for a motor having an armature winding and a series field winding, in combination, a power conductor, switching means for connecting the motor to the power conductor, additional switching means for establishing dynamic braking connections for the motor, said connections including a circuit for separately exciting the motor field winding, a manually operable controller for normally controlling the operation of said switching means, fluid-pressure actuated means for causing the operation of said switching means independently of said controller to disconnect the motor from the power conductor and establish said dynamic braking connections when the fluid pressure drops below a predetermined amount, control means controlled by said fluid-pressure actuated means for controlling the dynamic braking current, and relay means responsive to the dynamic braking current for also controlling the operation of said control means.

EDWARD B. FITZGERALD.

REFERENCES CITED

The following references are of record in the file of this patent:

UNITED STATES PATENTS

| Number | Name | Date |
|---|---|---|
| 765,460 | Cutler | July 19, 1904 |
| 876,594 | Schley | Jan. 14, 1908 |
| 1,081,550 | Myers | Dec. 16, 1913 |
| 1,264,299 | Hellmund | Apr. 30, 1918 |